United States Patent [19]

Utagawa et al.

[11] 4,264,810
[45] Apr. 28, 1981

[54] FOCUS DETECTING APPARATUS

[75] Inventors: Ken Utagawa, Yokohama; Hiroshi Shirasu, Kawasaki, both of Japan

[73] Assignee: Nippon Kogaku K. K., Tokyo, Japan

[21] Appl. No.: 972,261

[22] Filed: Dec. 22, 1978

[30] Foreign Application Priority Data

Dec. 24, 1977 [JP] Japan .................................. 52/155910
Feb. 6, 1978 [JP] Japan .................................. 53/12144

[51] Int. Cl.³ ............................................. G01S 1/36
[52] U.S. Cl. ...................................... 250/204; 354/25
[58] Field of Search .................. 250/204, 201; 354/25; 356/4

[56] References Cited

U.S. PATENT DOCUMENTS 3,838,275  9/1974  Stauffer ............................... 250/204

Primary Examiner—David C. Nelms
Assistant Examiner—Darwin R. Hostetter
Attorney, Agent, or Firm—Shapiro & Shapiro

[57] ABSTRACT

Focus detecting apparatus for an optical system including first and second image forming optical means for forming the image of an object along first and second spatially separated light paths, first and second photosensitive element arrays each comprising a plurality of photosensitive elements and producing an electrical signal representative of the intensity distribution pattern of the light incident thereon, and circuit means for detecting the focus of the optical system in accordance with the electrical signals from the first and second arrays. The circuit means includes a first processing circuit, a second processing circuit and a phase comparing circuit. The first processing circuit produces an electrical output having a phase representative of the positional relation between the first array and the intensity distribution pattern of the light incident on the first array, in accordance with the electrical signal from the first array. The second processing circuit produces an electrical signal having a phase representative of the positional relation between the second array and the intensity distribution pattern of the light incident on the second array, in accordance with the electrical signal from the second array, and the phase comparing circuit compares the phases of the electrical outputs from the first and second processing circuits and produces an output signal representative of the focus position of the optical system.

19 Claims, 30 Drawing Figures

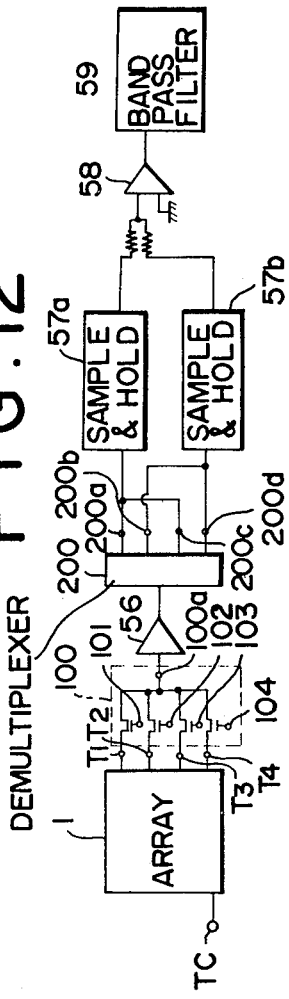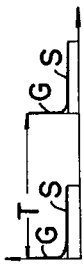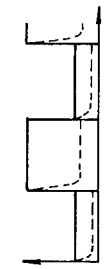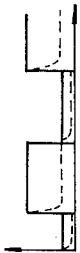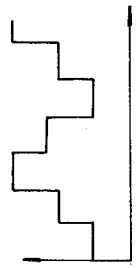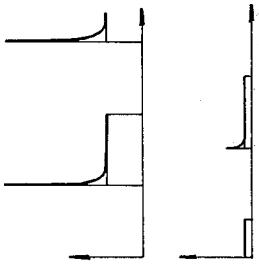

FOCUS DETECTING APPARATUS

BACKGROUND OF THE INVENTION

1. Field of the Invention

This invention relates to an automatic focus detecting apparatus for an optical system.

2. Description of the Prior Art

Various automatic focus detecting apparatuses have heretofore been proposed. For example, Japanese Laid-Open Patent Application No. 15432/1976 discloses a technique in which first and second light rays at two positions spaced apart from the optical axis of an image formation optical system are separated from a light beam immediately after the beam is passed through the image formation optical system. The separated first and second light rays impinge on first and second photosensitive element arrays disposed at predetermined focus positions of the first and second light rays in accordance with the in-focus and out-of-focus conditions of the image formation optical system. The outputs of the individual photosensitive elements of the first array are compared with the outputs of the corresponding photosensitive elements of the second array, and detection of the focus is effected in accordance with the result of the individual comparisons. This technique suffers from a disadvantage in that discrimination is made only as to whether the image formation optical system is in focus or out of focus and cannot be made as to whether the actual focal plane is forward (hereinafter referred to as forward focusing) or rearward (hereinafter referred to as backward focusing) with respect to a predetermined focal plane and as to the degree of the out-of-focus condition.

SUMMARY OF THE INVENTION

It is therefore an object of the present invention to provide an automatic focus detecting apparatus which can discriminate between forward focusing, in-focus, and backward focusing conditions and can also detect the degree of the out-of-focus condition with high accuracy.

In accordance with one of the broader aspects of the invention, in-focus, forward focusing, and backward focusing conditions are detected by comparing the phases of the electrical outputs of first and second signal processing circuits, which are dependent upon the intensity distribution pattern of light incident on first and second arrays of photosensitive elements.

The invention will become more fully apparent from the following detailed description thereof taken in conjunction with the accompanying drawings.

BRIEF DESCRIPTION OF THE DRAWINGS

FIG. 12 is a block diagram showing a specific construction of the example of FIG. 11.

FIGS. 13A-13D show waveforms of a photoelectric output.

FIGS. 14A-14C show the input and output waveforms of sample and hold circuits 57a and 57b of FIG. 12.

DESCRIPTION OF THE PREFERRED EMBODIMENTS

Before describing the present invention, description will first be made of the principle of the photoelectric converter device for an optical image, which is an important element of the present invention.

Figure 1:
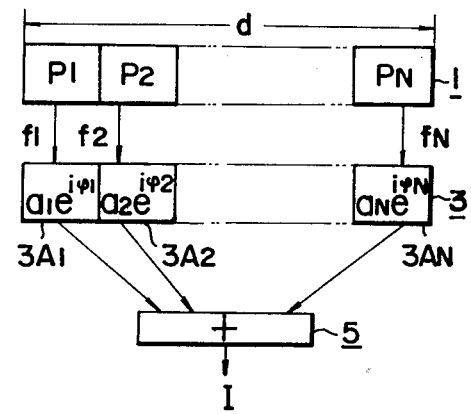
FIG. 1 shows a photoelectric converter device for an optical image, which is employed in the present invention.

In FIG. 1, when an optical image having a certain illumination distribution pattern is formed through an image formation optical system, not shown, on an element array 1 consisting of N photosensitive elements $P_1$ to $P_N$ arranged on a plane, the elements $P_1$ to $P_N$ produce photoelectric outputs $f_1$ to $f_N$ corresponding to the intensities of the light impinging on the respective ones of the elements. Vectorizing means 3 performs the function of vectorizing the photoelectric outputs $f_1$ to $f_N$, namely, imparting phase information to each output thereof, and has N multiplication means $3A_1$ to $3A_N$.

Each multiplication means $3A_1$ to $3A_N$ multiplies the associated photoelectric outputs $f_1$ to $f_N$ by a vector $a_1 e^{i\psi_1}$ to $a_N e^{i\psi_N}$, respectively, and generates a vector output $f_1 a_1 e^{i\psi_1}$ to $f_N a_N e^{i\psi_N}$. The arguments $\psi_1$ to $\psi_N$ of of the respective vectors are determined so as to satisfy the relation that $\psi_1 < \psi_2 < \ldots < \psi_N$. Adder means 5 adds together the vector outputs of the multiplication means $3A_1$ to $3A_N$ and finds the combined vector $$I = \sum_{n=1}^{N} f_n \cdot a_n e^{i\psi_n}.$$

The nature of the combined vector which is the output of the adder means 5 so obtained will hereinafter be considered. If, for simplicity of description, all the absolute values of the vectors $a_1 e^{i\psi_1}$ to $a_N e^{i\psi_N}$ are equal and the values thereof are 1, that is, $a_n=1 (n=1,\ldots,N)$ and the argument $\psi_n$ of the vector multiplier of the nth element $P_n$ from the leftmost element $P_1$ is determined as $\psi_n = 2\pi x n/N$, that is, so that the vector rows $e^{i\psi}1$ to $e^{i\psi}N$ become one period (one full rotation in terms of phase), $$I = \sum_{n=1}^{N} f_n e^{i2\pi \times \frac{n}{N}} = \sum_{n=1}^{N} f_n \exp(i2\pi n/N). \quad (1)$$

The right side of this equation (1) is the very Fourier transform or spatial frequency component of which the spatial period is equal to the spatial length d of this array. Therefore, the output of the adder means 5 is representative of the spatial frequency component of specific spatial period d extracted from the optical image.

Next, the combined vector $I'$, when the optical image on this element array 1 is displaced by an amount corresponding to one element in the leftward direction of the array of elements in FIG. 1, is obtained. At this time, the photoelectric output of the element $P_n$ is $f_{n+1}$, and this is multiplied by the vector $e^{i2\pi xn/N}$. Now, for example, the output of $P_1$ is $f_2$ and the output of $P_N$ is $f_{N+1}$. Output $f_{N+1}$ is the output attributable to the intensity of light which was just to the right of $P_N$ before the displacement of the optical image.

Hence, $$I' = \sum_{n=1}^{N} f_{n+1} \cdot e^{i2\pi \times \frac{n}{N}} = \sum_{n=1}^{N} f_n \cdot e^{i2\pi \times \frac{n-1}{N}} + \quad (2.)$$

$$f_{N+1} e^{i2\pi \times \frac{N}{N}} - f_1 \cdot e^{i2\pi \times \frac{0}{N}} = e^{-i2\pi \times \frac{1}{N}}.$$

$$\sum_{n=1}^{N} f_n \cdot e^{i2\pi \times \frac{n}{N}} + (f_{N+1} - f_1) e^{i2\pi}$$

$f_{N+1}$ of the second term in the equation (2) is representative of the light which has newly entered into the array due to the displacement of the optical image, and $f_1$ is representative of the light which has left the array. If the second term $(f_{N+1}-f_1)e^{i2\pi}$ is negligible with respect to the first term, namely, if $f_{N+1}$ and $f_1$ are substantially equal, it is seen from the comparison between equation (1) and equation (2) that the combined vector $I'$ after the displacement is equal to the combined vector $I$ before the displacement plus $e^{-2\pi x 1/Ni}$. This shows that when the image is displaced by an amount corresponding to the width of one element in the direction of the array of elements, the phase of the combined vector $I$ is primarily increased or decreased by $2\pi/N$ in accordance with the direction of displacement.

Figure 2A:
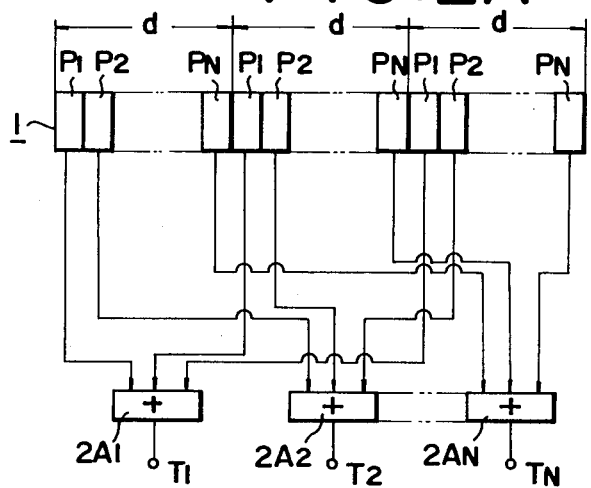
FIGS. 2A-2C illustrate an embodiment of a photosensitive element array used with the photoelectric converter device.
Figures 2B, 2C:
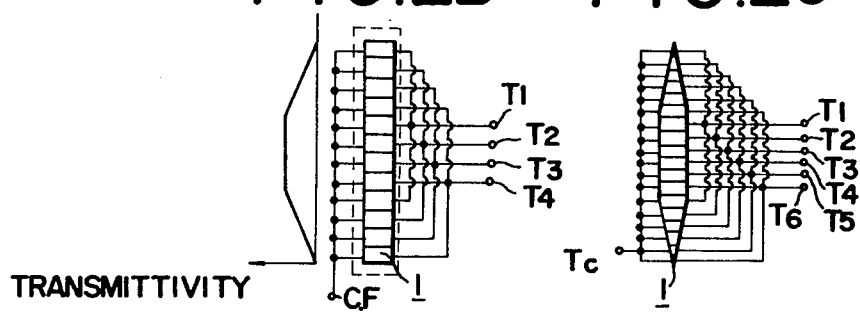

As noted above, the second term of the above equation (2) is entirely negligible when the quantity of light which newly enters the array due to the displacement is substantially equal to the quantity of light which leaves the array. To ensure that the second term is entirely negligible even for an optical image of any other illumination distribution, the element array 1 may be constructed as shown in FIG. 2A. The photosensitive element array 1 is constructed by arranging several sets of photosensitive elements $P_1$ to $P_N$ (three sets in the shown example) in series, and the elements ($P_1, P_1, P_1$), ($P_2, P_2, P_2$) ... ($P_N, P_N, P_N$) at the corresponding positions in the respective sets are connected to associated adders $2A_1, 2A_2, \ldots 2A_N$. By such construction, the total photoelectric output of the corresponding elements in the respective element sets is generated from the output terminals $T_1, T_2, \ldots, T_N$ of the respective adders. The photoelectric outputs appearing at the output terminals $T_1$ to $T_N$ may be multiplied by the vectors $a_1 e^{i\psi}$, to $a_N e^{i\psi_n}$ as in FIG. 1. By such an array construction in which several sets of one-period elements are so arrayed in series, the influence on the combined vector $I$ at the outputs of the photosensitive elements located at the opposite ends of the array is smaller than in the array 1 consisting of a set of one-period elements alone, so that the second term of the above equation (2) becomes negligible. To ensure this result, as shown in FIG. 2B a concentration filter CF is disposed forwardly of the array consisting of three sets of elements, and the light transmitting characteristic of the filter may be determined such that the transmittivity is gradually decreased toward the opposite ends of the array, or as shown in FIG. 2C the light-receiving surfaces of the elements near the opposite ends of the array may be gradually decreased as compared with the light-receiving surfaces of the elements in the middle of the array. By these techniques, the outputs of the photosensitive elements near the opposite ends of the array 1 are relatively small with respect to the outputs of the other photosensitive elements, and therefore, the influence upon the combined vector $I$ can be made smaller. It is desirable to determine the concentration characteristic of the filter CF or the variation in the light-receiving surface area of the photosensitive elements so that the combined vector $I$ may be zero when an optical image of uniform illumination distribution is formed on the array. In FIGS. 2B and 2C, the adders $2A_1$ to $2A_N$ of FIG. 2A are shown diagrammatically as the interconnection between the output terminals of the corresponding elements in the element sets to avoid complication of the illustration.

The present invention achieves the detection of the focus of an image formation optical system by using at least two devices for converting the photoelectric output of each element of an array, as described above, into an electrical signal whose phase is primarily varied in accordance with the relative variation in an optical image for the array. Embodiments of the present invention will now be described in detail.

Figure 3:
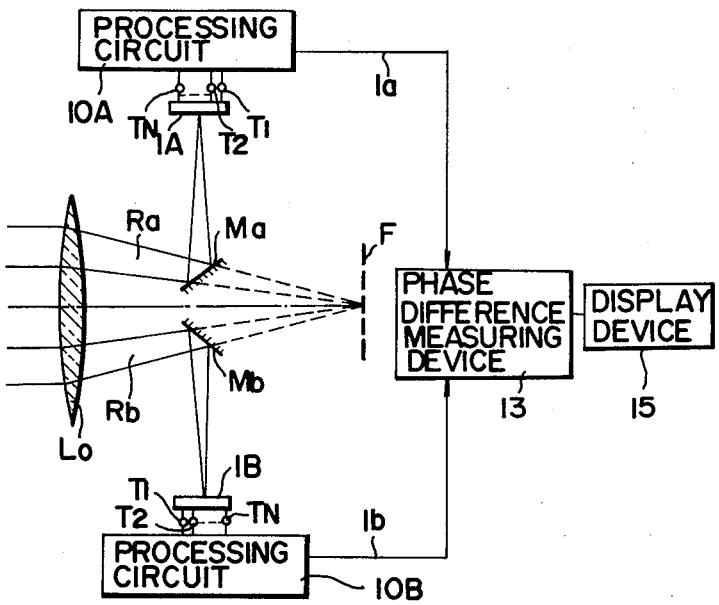
FIG. 3 shows an embodiment of an automatic focus detecting apparatus according to the present invention.
Figure 4A:
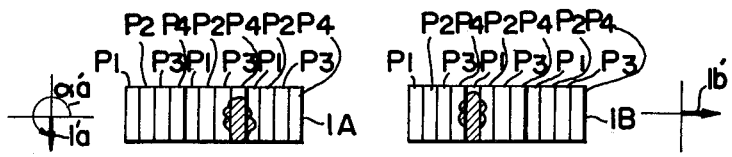
FIGS. 4A-4C show an image formed on the photosensitive elements in the apparatus of FIG. 3 and the condition of the output vector thereof.
Figure 4B:
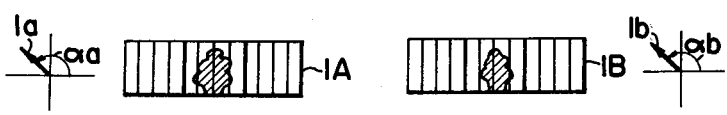
Figure 4C:

FIG. 3 is a schematic view of an embodiment of the automatic focus detecting apparatus of the present invention and particularly shows the relation between the photosensitive element array and the optical system. Light beams $R_a$, $R_b$ from an unshown object, an image of which is to be focused, are passed through two spatially different portions of an image forming lens $L_O$, reflected by a pair of mirrors $M_a$ and $M_b$ and separated from other light beams from the object. In the shown embodiment, the two mirrors $M_a$ and $M_b$ lie at positions symmetric with respect to the optical axis of the lens $L_O$ and reflect the light beams $R_a$ and $R_b$ incident thereon in a direction perpendicular to the optical axis. A photosensitive element array 1A, comprising a plurality of sets of photosensitive elements corresponding to a plurality of periods and adders, as shown in FIG. 2A, for example, is disposed in a plane in the path of the reflected light from the mirror $M_a$ and conjugate with the fixed focal plane F of the lens $L_O$. A photosensitive element array 1B identical to the array 1A is similarly disposed at a location in the path of the reflected light from the mirror $M_b$. The two arrays 1A and 1B are such that an image is formed on the corresponding elements of the two arrays 1A and 1B, as shown in FIG. 4B, when the lens $L_O$ is in focus. In FIGS. 4A-4C, there is shown an array in which the number N of the elements forming each element set is 4 and the number of the sets of elements is 3. Connected to these arrays 1A and 1B are processing circuits 10A and 10B (FIG. 3) for processing photoelectric outputs at the adder output terminals $T_1$ to $T_N$ thereof and generating the electrical signal of the combined vector I described in connection with FIG. 1.

If the connection relation between the array 1A and the circuit 10A is determined such that the argument of the vector multiplied with the output of the photosensitive element $P_{n+1}$ leftwardly adjacent to the element $P_n$ is greater than the argument $\psi_n$ of the vector $a_n e^{i\psi_n}$ multiplied with the output of any photosensitive element $P_n$ in this array, namely, in FIG. 3, if the array 1A is such that the elements $P_1, P_2, \ldots, P_N$ are arranged from right to left, then the connection relation between the array 1B and the circuit 10B is determined conversely, namely, such that in FIG. 3, the elements $P_1, \ldots, P_N$ are arranged from left to right. With such an arrangement, when the lens $L_O$ is as shown in FIG. 4B, each of the light beams $R_a$ and $R_b$ forms a focused image of the object at the same position on the arrays 1A and 1B, so that the circuits 10A and 10B produce combined vectors $I_a$ and $I_b$, respectively, having identical argument $\alpha_a$ and $\alpha_b$.

If forward focusing is now brought about from this state, the image of the object is formed forwardly of the fixed focal plane F, and therefore each image on the arrays 1A and 1B is displaced leftwardly as viewed in FIG. 3. If, instead, backward focusing is brought about, the images on the arrays 1A and 1B are displaced rightwardly in FIG. 3. In case of forward focusing or backward focusing, the light beams $R_a$ and $R_b$ do not form a focused image of the object on the arrays 1A and 1B, but this is not important, because the focus detecting apparatus can still detect the illumination pattern of the images on the arrays 1A and 1B.

When the image is displaced leftwardly as viewed in FIG. 3 due to forward focusing, the image is displaced rightwardly on the array 1A and displaced leftwardly on the array 1B, as shown in FIG. 4A, in which the direction of arrangement of the elements in the element arrays 1A and 1B is shown in a uniform manner, and accordingly, the then output vector $I'_a$ of the processing circuit 10A has argument $\alpha'_a$ greater than the argument $\alpha$ during the infocus condition and conversely, the argument $\alpha'_b$ of the output vector $I'_b$ of the processing circuit 10B becomes smaller. In case of backward focusing, the situation is reversed, as shown in FIG. 4C. Therefore, by measuring the phase difference $\alpha_a - \alpha_b$ between the outputs of the processing circuits 10A and 10B by means of a phase difference measuring device 13, as shown in FIG. 3, it is seen that the optical system is in focus when $\alpha_a - \alpha_b = 0$, that the optical system is in the forward focusing condition when $\alpha_a - \alpha_b > 0$ and that the optical system is in the backward focusing condition when $\alpha_a - \alpha_b < 0$.

The absolute value $|\alpha_a - \alpha_b|$ of this phase difference becomes greater as the optical system is more deviated from its in-focus condition. Therefore, if the output of the phase difference measuring device 13 is connected to a display device 15, the discrimination between the forward focusing, the in-focus and the backward focusing conditions and the degree thereof can be displayed on the display device in accordance with the sign and magnitude of the output of the phase difference measuring device 13. It is, of course, possible to effect automatic focusing if, for example, the driving mechanism for the lens $L_O$ is operated in accordance with the output of the phase difference measuring device 13.

Figure 5:
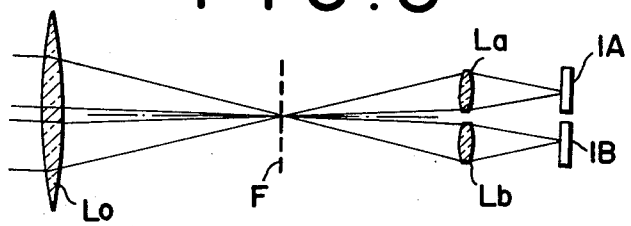
FIG. 5 shows an arrangement of lenses and photosensitive elements in another embodiment of the present invention.

FIG. 5 shows an example in which light beams passed through the image forming lens $L_O$ off the optical axis are separated into two directions by two image-reforming lenses $L_a$ and $L_b$ disposed rearwardly of the fixed focal plane F of the lens $L_O$ and substantially symmetrically with respect to said optical axis and are focused on the pair of element arrays 1A and 1B disposed in a plane conjugate with the plane F with respect to the lenses $L_a$ and $L_b$. With this modification, the system may otherwise conform to the embodiment of FIG. 3.

Figure 6:
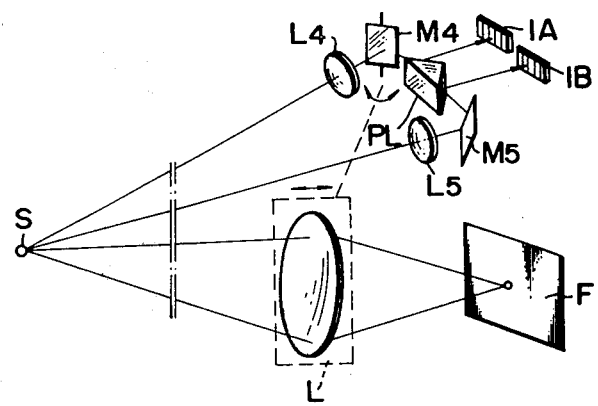
FIG. 6 shows an arrangement of an optical system in another embodiment of the present invention.

FIGS. 3 and 5 show examples in which the light passed through a single image forming lens $L_O$ is separated into two parts, but an example of an optical system which differs therefrom will now be described by reference to FIG. 6. In FIG. 6, mirrors $M_4$ and $M_5$ are disposed rearwardly of a pair of image forming lenses $L_4$ and $L_5$, respectively, for forming an image of an object S. The mirror $M_5$ associated with the lens $L_5$ is stationary, while the mirror $M_4$ associated with the lens $L_4$ is operatively interlocked with an image forming lens L whose focus is to be detected and is pivotable in the direction of the adjacent arrow in response to axial movement of the lens L. Any conventional mechanical linkage may be used for this purpose. A prism PL is provided to cause the light reflected by the mirrors $M_4$ and $M_5$ to be further reflected toward the respective photosensitive element arrays 1A and 1B. Of course, these photosensitive element arrays 1A and 1B are disposed in the fixed focal planes of the lenses $L_4$ and $L_5$. The position of the image of the object S formed on the element array 1B by the lens $L_5$ is determined only by the position of the object S relative to the lens $L_5$. On the other hand, the position of the image of the object S formed by the lens $L_4$ is displaced in the direction of arrangement of the elements in the array 1A by the angle of rotation of the associated mirror $M_4$, and therefore, if the relation between the lens $L_O$ and the associated mirrors and the element arrays 1A and 1B is determined such that the image of the object S occupies the same position with respect to the arrays 1A and 1B, as shown in FIG. 4B, when the image forming lens $L_O$ is in its in-focus condition and that the image of the object S is moved in the opposite direction with respect to the arrays 1A and 1B, as shown in FIGS. 4A and 4C, when the image forming lens $L_O$ is in its forward focusing or backward focusing condition, then automatic focus detection of the image forming lens $L_O$ may be achieved by processing the outputs of the element arrays 1A and 1B in a manner similar to that described in connection with FIG. 3.

Description will now be made of examples of the construction of processing circuits 10A and 10B, namely, vectorizing means and adder means, which may be employed in the foregoing embodiments, for instance.

A first example of the construction is such that to multiply the output $f_n$ of each photosensitive element by the vector $a_n e^{i\psi_n}$, the output $f_n$ is multiplied by x and and y components of the vector and the photosensitive element outputs multiplied by the x component are added together to obtain the x component X of the combined vector I, and the photosensitive element outputs multiplied by the y component of the vector are added together to obtain the y component Y of the combined vector I. That is, this construction example is such that the combined vector I is calculated in the form of the x and y components X, Y.

Figure 7:
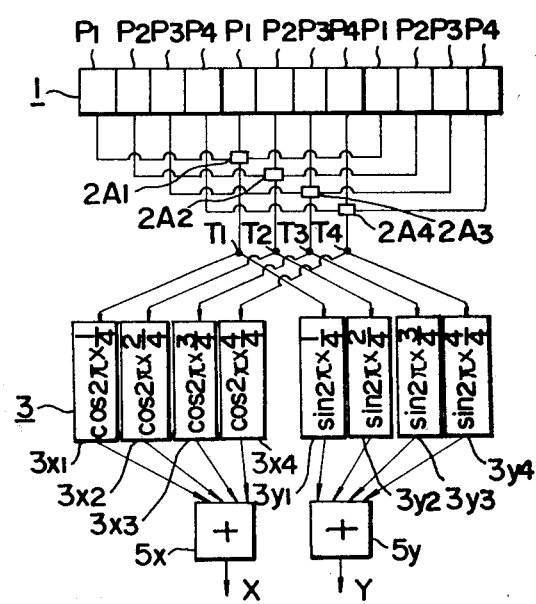
FIG. 7 shows a first example of the construction of a vectorizing means for producing an output.

In FIG. 7, the number of elements forming one period is shown as 4 and the number of periods in the array, i.e., the number of sets of elements, is shown as 3. The photosensitive elements $P_1$–$P_4$ of each element set are connected to adders $2A_1$–$2A_4$, respectively. Accordingly, the total photoelectric output of the elements $P_1$ of the respective element sets appears at the terminal $T_1$, and similar photoelectric outputs also appear at the terminals $T_2$–$T_4$. To multiply the outputs of $T_1$–$T_4$ by vectors $e^{i2\pi x \frac{1}{4}}$, $e^{i2\pi x(2/4)}$, $e^{i2\pi x \frac{3}{4}}$ and $e^{i2\pi x 4/4}$, they are multiplied by xy components of the vectors, (cos $2\pi x\frac{1}{4}$, sin $2\pi x\frac{1}{4}$)=(0, 1), (cos $2\pi x2/4$, sin $2\pi x2/4$)=(−1,0), (cos $2\pi x\frac{3}{4}$, sin $2\pi x\frac{3}{4}$)=(0,−1) and (cos $2\pi x4/4$, sin $2\pi x4/4$)=(1, 0). In the figure, the terminals $T_1$–$T_4$ are connected to multipliers $3x_1$–$3x_4$ to multiply by the x component row 0, −1, 0, 1 and connected to multipliers $3y_1$–$3y_4$ to multiply by the y component row (1, 0, −1, 0). An adder $5x$ sums up the outputs of the multipliers $3x_1$–$3x_4$ to put out the x component X of the combined vector and an adder $5y$ likewise sums up the outputs of the multipliers $3y_1$–$3y_4$ to put out the y component Y of the combined vector.

Figure 8:
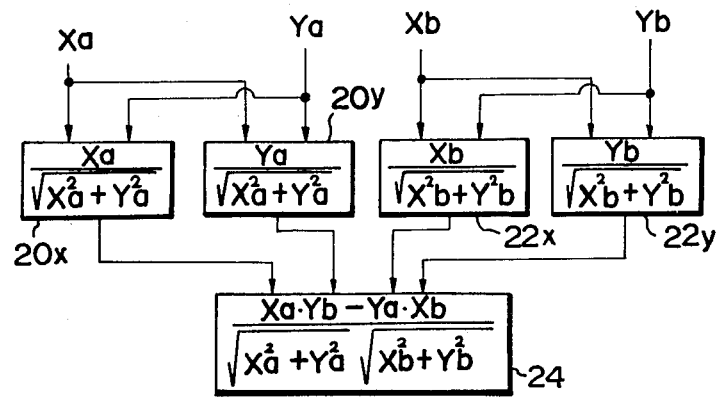
FIG. 8 shows an embodiment of a phase difference calculating means for two output vectors.

If a processing circuit for calculating such a combined vector I in the form of its components X, Y is used in the above-described circuits 10A and 10B, the outputs Ia and Ib of the circuits 10A and 10B are put out in the form of (Xa, Ya) and (Xb, Yb), respectively. From these (Xa, Ya) and (Xb, Yb), the phase difference of Ia and Ib may be obtained in any of various manners and a particularly preferred method of calculation will hereinafter be described. In FIG. 8, the absolute values of the vectors Ia=(Xa, Ya) and Ib=(Xb, Yb) are greatly dependent upon the average illumination of the optical image and therefore, Xa, Ya, Xb and Yb are standardized by operating circuits 20x, 20y, 22x and 22y so that they are not dependent on the average illumination and are converted into:

$$\frac{Xa}{\sqrt{Xa^2 + Ya^2}}, \frac{Ya}{\sqrt{Xa^2 + Ya^2}},$$
$$\frac{Xb}{\sqrt{Xb^2 + Yb^2}}, \frac{Yb}{\sqrt{Xb^2 + Yb^2}}$$

The outer product of these standardized vectors Ia and Ib, $$Q = \frac{Xa\, Yb - Ya\, Xb}{\sqrt{Xa^2 + Ya^2}\, \sqrt{Xb^2 + Yb^2}}$$

is obtained by an operating circuit 24. This outer product Q, as is well-known, has a relationship with the angle formed by the two vectors Ia and Ib, so that the magnitude of the argument difference, i.e., phase difference, between the two vectors Ia and Ib can be determined, including the sign thereof, in accordance with the output of the circuit 24. Consequently, the discrimination between the forward focusing, the in-focus and the backward focusing conditions and the degree thereof can be determined from the value of Q.

In the above example, one period is formed by four photosensitive elements and the absolute values of the vector multipliers are equal to each other. Therefore, when an optical image of uniform illumination distribution is formed on the array, the combined vector is preferably zero, but to obtain such a result, for example, one period may be formed by an even number of elements and the absolute values of the vectors deviated by half a period may be determined so that they are equal to each other.

Figure 9:
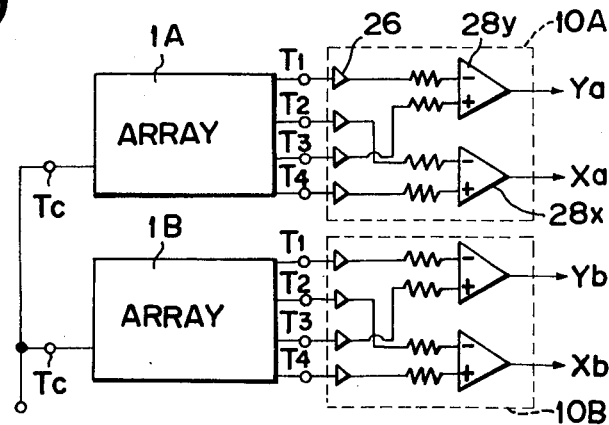
FIG. 9 diagrammatically shows a specific circuit in the example of FIG. 7.

Reference is now had to FIG. 9 to describe a specific circuit of this first construction example. N=4, and therefore the photosensitive element array 1A has four output terminals $T_1$ to $T_4$ as specifically shown in FIG. 2B and the outputs appearing there are individually amplified by four amplifiers 26. The x component row multiplied with these outputs is 0, −1, 0, 1 as already noted, and therefore to obtain the x component $X_a$, the outputs of the terminals $T_2$ and $T_4$ may be multiplied by −1 and 1, respectively, whereafter the two may be added together, but in the present circuit example, the outputs of the terminals $T_2$ and $T_4$ are multiplied by 1 and 1, respectively, whereafter the difference between the two is obtained. That is, the outputs of the terminals $T_2$ and $T_4$ are connected to equal resistances through amplifiers 26, whereby they are multiplied by the above-mentioned x component 1 and connected to the two inputs of a differential amplifier 28x. Since the y component row is 1, 0, −1, O, Ya may be obtained by applying each of the outputs of the terminals $T_1$ and $T_3$ to a differential amplifier 28y through amplifiers 26 and resistances equal to that stated in the case of Xa. As also regards the other element array 1B and the other processing circuit 10B, Xb and Yb may be obtained by a similar construction. From these (Xa, Ya) and (Xb, Yb), the phase difference between the combined vectors Ia and Ib may be obtained by the construction of FIG. 8.

The other terminals of the respective photosensitive elements in each array are connected to the common output terminal Tc of each element array, and the common terminal Tc is connected to a power source, not shown.

In the above example, of course, the x component and y component, except zero, to be multiplied with the photoelectric output are all equal, and so the values of the resistances are identical, but if the x component or the y component varies, a resistance of a value corresponding to the magnitude of the component is selected.

An improved modification of the above-described embodiment will now be described by reference to FIG. 10. In this modification, photodiodes are used as the photosensitive elements, the common terminal Tc of the photodiode arrays 1A and 1B is grounded, and the respective output terminals $T_1$–$T_4$ are connected to associated FET switching elements SW. These eight switching elements SW are all synchronously turned on and off by a control circuit 30. Therefore, each photodiode in the arrays 1A and 1B continues to store the charge excited therein by incident light at a junction capacity of the photodiode while the switching elements SW are turned off and momentarily produces a photoelectric current corresponding to both the length of the OFF time of the switching elements SW and the intensity of incident light during the time when switching elements SW are turned on. The switched (AC) outputs from these photodiodes have the same period and the same phase. The photoelectric currents of the photodiodes of the array 1A, so produced, are applied as inputs through associated resistors to differential amplifiers 28x and 28y. Sample-and-hold circuits 32x and 32y rectify the outputs of the differential amplifiers 28x and 28y in accordance with a signal corresponding to the ON-OFF period of the switching elements SW controlled by the control circuit 30 and convert the same into DC outputs Xa and Ya. The control circuit 30 receives as inputs the above-described Xa and Ya and when the sum of the absolute values thereof is small, namely, when the average illumination of the optical image is low, it increases the ON-OFF period of the switching elements SW in accordance with the degree of the average illumination, increases the OFF time of the elements SW, increases each photoelectric current, and places the magnitude of the photoelectric currents substantially into a certain range irrespective of the variation in average illumination of the optical image. Of course, the photoelectric currents from the element array 1B are also converted into Xb and Yb by the same processing.

In this specific example, the circuit for obtaining the phase difference between the vectors Ia=(Xa, Ya) and Ib=(Xb, Yb) also adopts a different construction from that of FIG. 8. This circuit will hereinafter be described in detail. Xa is multiplied by AC signal $\sin \omega t$ and Ya is multiplied by AC signal $\cos \omega t$, and when the two are added together, there is obtained a signal $$\sqrt{Xa^2 + Ya^2} \sin(\omega t + \alpha_a),$$

where $\alpha_a$ is the argument of the vector Ia. Likewise, Xb is multiplied by $\cos \omega t$ and Yb is multiplied by $\sin \omega t$, and when the latter is subtracted from the former, there is obtained $$\sqrt{Xb^2 + Yb^2} \cos(\omega t + \alpha_b),$$

where $\alpha_b$ is the argument of the vector Ib. In this manner, the arguments of the vectors Ia and Ib can be expressed as the phase of an AC signal of a certain frequency $\omega$. When the arguments of the vectors Ia and Ib are in accord with each other, namely, during the in-focus condition, a phase difference of $\pi/2$ is imparted to the two AC signals, in other words, a sine signal is obtained for one vector, Ia, while a cosine signal is obtained for the other vector, Ib. Multiplying the two signals and integrating the same to thereby obtain $\sin(\alpha_a - \alpha_b)$ is formulated as:

$$\frac{2}{T_0} \int_0^{T_0} \sin(\omega t + \alpha_a) \times \cos(\omega t + \alpha_b) dt = \sin(\alpha_a - \alpha_b).$$

This integration output is zero during the in-focus condition, which facilitates the detection of the in-focus condition.

Figure 10:
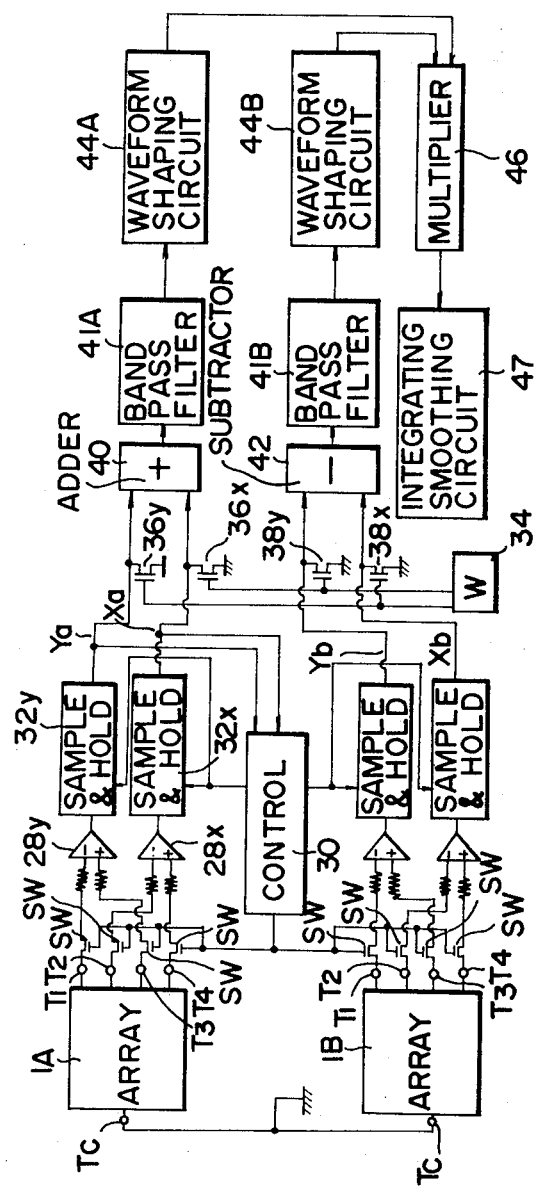
FIG. 10 shows an improved modification of the circuit example of FIG. 9.

Describing this by reference to FIG. 10, the DC outputs Ya and Xb are switched on and off at the same frequency $\omega$ by the FET switching elements 36y and 38x, and the DC outputs Xa and Yb are switched on and off at the same frequency $\omega$, but with a phase deviation of $\pi/2$, by similar FET switching elements 36x and 38y. These four FET switching elements 36x, 36y, 38x and 38y are controlled by the output from a control 34. Thus, Xa and Ya are converted into rectangular wave signals having the same frequency $\omega$ but out of phase by $\pi/2$, whereafter they are added together by an adder 40. A band-pass filter 41A for frequency $\omega$ extracts the frequency component of $\omega$ from the output of the adder 40. Thus, the extracted output of this filter 41A contains much of the above-described $$\sqrt{Xa^2 + Ya^2} \sin(\omega t + \alpha_a).$$

Likewise, as regards Xb and Yb, $$\sqrt{Xb^2 + Yb^2} \cos(\omega t + \alpha_b)$$

is obtained as the output of a band-pass filter 41B by using a subtractor 42 instead of the adder 40. A waveform shaping circuit 44A converts the output of the band-pass filter 41A into a rectangular wave signal of uniform amplitude while maintaining the phase and frequency of said output unchanged. Likewise, a waveform shaping circuit 44B converts the output of the band-pass filter 41B into a rectangular wave signal of uniform amplitude. A multiplier 46 multiplies together the rectangular wave outputs of the two circuits 44A and 44B, and an integrating-smoothing circuit 47 integrates and smooths the output of the multiplier 46. By this, the output of the integrating-smoothing circuit 47 becomes a value associated with the argument difference between the vectors Ia and Ib, and therefore the forward focusing and the backward focusing conditions and the degree thereof as well as the infocus condition at zero output may be detected in accordance with the positive or the negative sign and the magnitude of this output.

Also, the vector I can be obtained in the form of its components X and Y by using photodiode arrays or charge-coupled devices as the photosensitive element arrays and outputting the illumination distribution of an optical image as a time-serialized electrical signal, multiplying this photoelectric output by $\cos \omega t$ and integrating the same, and multiplying the photoelectric output by $\sin \omega t$ and integrating the same. That is, $$X = \int I(t) \cos \omega t \, dt,$$

$$Y = \int I(t) \sin \omega t \, dt,$$

where $I(t)$ is the time-serialized photoelectric output.

Description will now be made of another form of processing circuit according to the present invention.

Figure 11:
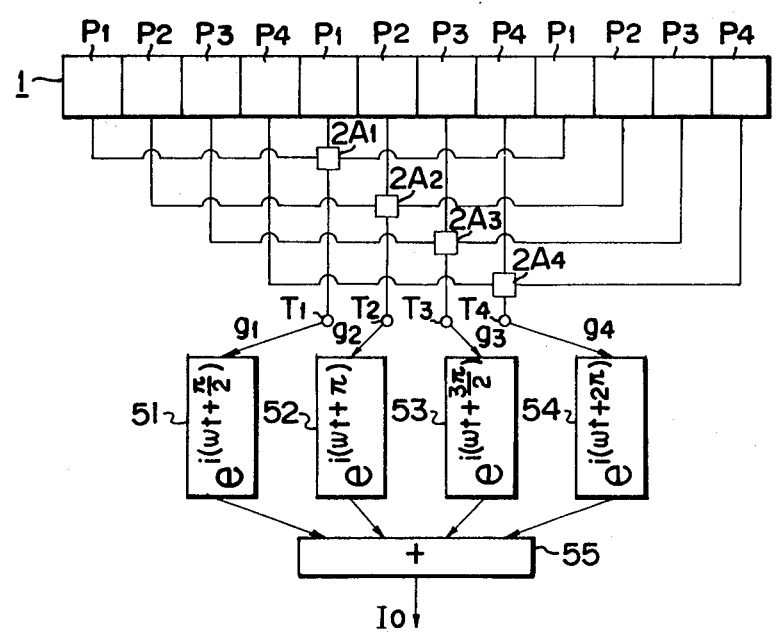
FIG. 11 shows a second example of the construction of a phase information containing output generating circuit of the present invention.

In FIG. 11, the construction of the photodiode array 1 is identical to that of FIG. 7, and the photoelectric outputs appearing at output terminals $T_1$ to $T_4$ are $g_1$ to $g_4$. These photoelectric outputs $g_1$ to $g_4$ are multiplied by alternating currents having equal frequencies but advanced in phase by $2\pi/4$ each, that is, $e^{i(\omega t + \pi/2)}$, $e^{i(\omega t + \pi)}$, $e^{i(\omega t + 3/2\pi)}$ and $e^{i(\omega t + 2\pi)}$, by the use of multipliers 51 to 54. Thus, the photoelectric outputs $g_1$ to $g_4$ are converted into $g_1 e^{i(\omega t + \pi/2)}$ to $g_4 e^{i(\omega t + 2\pi)}$, which are AC outputs having equal frequencies but advanced in phase by $2\pi/4$ each and having amplitudes proportional to the magnitudes of the photoelectric outputs. An adder 55 adds together the AC outputs of the multipliers 51 to 54 and produces a combined AC output $I_O$. Of course, in this example, four photosensitive elements form one period, and therefore the AC outputs are out of phase with each other by $2\pi/4$ each, but generally, where N elements form one period, use is made of AC outputs out of phase by $2\pi \times n/N$ each. Now, for a general case, the combined output $I_O$ of the adder 55 is to be obtained:

$$I_0 = \sum_{n=1}^{N} g_n \cdot e^{i(\omega t + 2\pi \times \frac{n}{N})} = e^{i\omega t} \sum_{n=1}^{N} g_n \cdot e^{i2\pi \times \frac{n}{N}} \quad (3)$$

As is apparent from comparison of this equation with equation (1), this combined output $I_O$ is primarily varied in phase if the optical image is displaced relative to the array I in the direction of arrangement of the elements thereof. Reference is now had to FIG. 12 to describe a specific circuit of this second construction example.

In FIG. 12, the photosensitive element array 1 is identical in construction to FIG. 2B, and has four output terminals $T_1$ to $T_4$ which are connected to a multiplexer 100. This multiplexer 100 consists of four FET's 101 to 104 series-connected to the output terminals $T_1$ to $T_4$ and a driving system (not shown) for turning on and off these FET's with equal ON-OFF times and at a period T. This driving system delays the ON-OFF period of the FET's 102, 103, and 104 connected to the output terminals $T_2$, $T_3$, and $T_4$, respectively, by $2\pi/4$ each relative to the ON-OFF period of the FET 101 connected to the output terminal $T_1$. Therefore, the output appearing at the output terminal $T_1$ which is the sum of the photoelectric outputs of the first photodiodes of the element sets is modulated by the ON-OFF waveform of the FET 101, and as shown in FIG. 13A a large current G momentarily flows at the rise time due to the charge stored chiefly in the junction capacity of the photodiode during the turn-off of the FET's and immediately thereafter, a steady current S appears. Also, the outputs appearing at the terminals $T_2$, $T_3$ and $T_4$ which are respectively the sums of the second, the third, and the fourth of the element sets are converted into AC signals delayed in phase by $2\pi/4$ each as shown in FIGS. 13B, 13C and 13D. Since the output terminals of the FET's 101–104 are connected to a common output terminal 100a, the signals shown in FIGS. 13A, 13B, 13C and 13D, successively appear at the output terminal 100a of the multiplexer in the fashion of a time series. That is, an output resulting from the addition of the signals of FIGS. 13A, 13B, 13C and 13D appears at the output terminal 100a.

In the present embodiment, it is desired to use not the steady current S but a rectangular wave current prepared by holding the peak of the momentary large current G for a time T/2. If the large current G of FIG. 13A which is the first to appear is held for a time T/2, it becomes impossible to hold the first large current G of FIG. 13B which is next to appear. To avoid such a situation, a demultiplexer 200 is used. More particularly, the output appearing at the output terminal 100a of the multiplexer 100 is amplified by an AC amplifier 56, whereafter it is applied as input to the demultiplexer 200. This demultiplexer 200 is in synchronism with the multiplexer 100 and decomposes the input signal and puts out the signals as shown in FIGS. 13A, 13B, 13C and 13D at the output terminals 200a to 200d thereof in the fashion of a time series. The outputs at the output terminals 200a and 200c are applied to a first sample-and-hold circuit 57a operable in synchronism with the multiplexer 100, so that this sample-and-hold circuit 57a receives the amplified signal in FIG. 13A and the amplified signal in FIG. 13C, as indicated by the dotted line in FIG. 14A, and holds the peaks of the large currents G for a time T/2. Therefore, circuit 57a produces an output as indicated by the full line in FIG. 14A. Likewise, a second sample-and-hold circuit 57b holds the outputs from the output terminals 200b and 200d, as indicated by dotted lines in FIG. 14B and produces an output as indicated by the full line in FIG. 14B. When the outputs of the first and second sample-and-hold circuits 57a and 57b are added together by an adder 58, there is obtained the output as shown in FIG. 14C. By passing this output through a band-pass filter 59 for $2\pi/T$, there is obtained a sine wave output whose phase is varied in accordance with displacement of the optical image.

Figure 15:
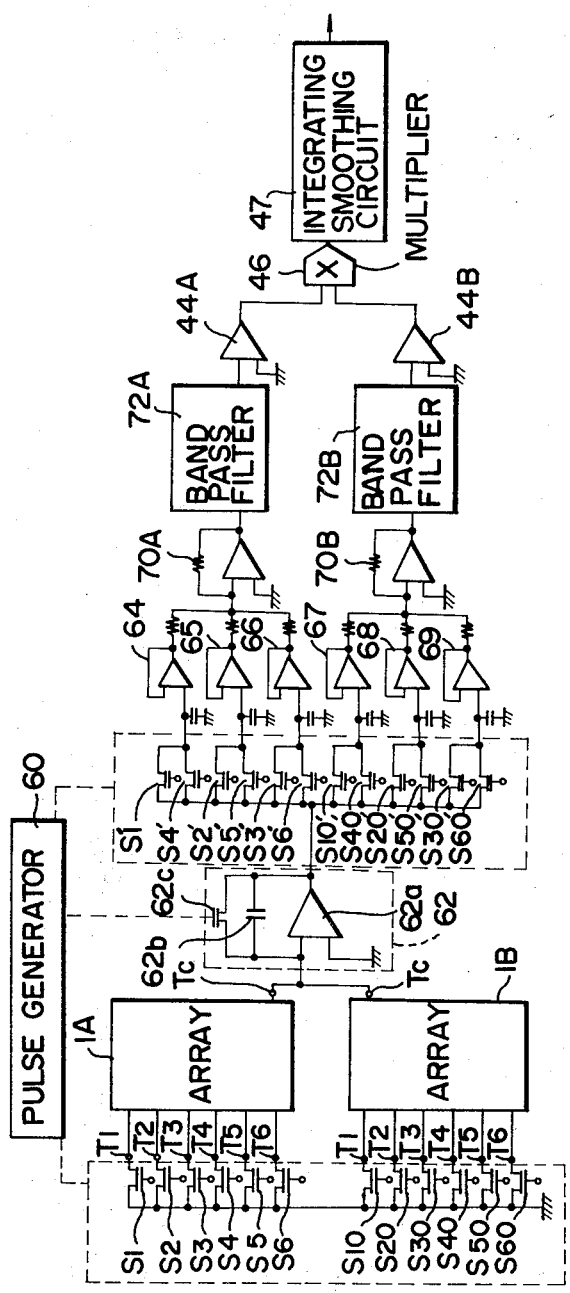
FIG. 15 is a block diagram showing another specific construction of the example of FIG. 11.
Figure 16:
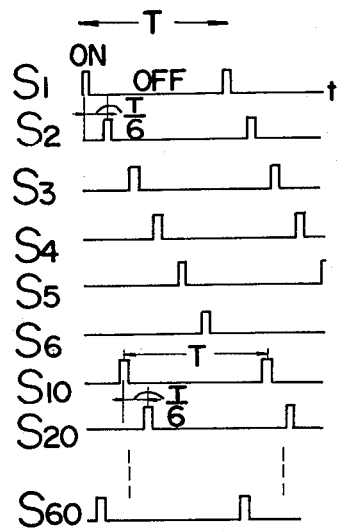
FIG. 16 shows pulses for driving the switching FET of FIG. 15.
Figure 17A:
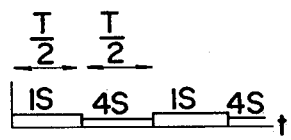
FIGS. 17A-17C show the output of the peak hold circuit of FIG. 15.
Figure 17B:
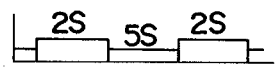
Figure 17C:
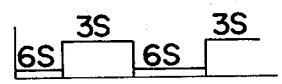
Figure 18:
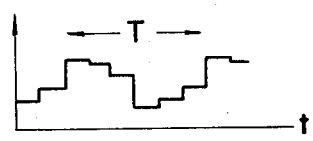
FIG. 18 shows the output of the adder circuit of FIG. 15.
Figure 19:
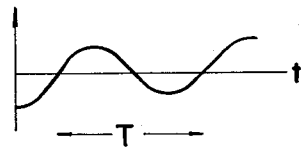
FIG. 19 shows the output of the band-pass filter of FIG. 15.

Reference is now had to FIG. 15 to describe another specific circuit of the second construction example of FIG. 11. In this example, photodiodes are used as the photosensitive elements and six elements form one period, namely, N=6, and the constructions of the pair of element arrays 1A and 1B are such as shown in FIG. 2C. The output terminals $T_1$ to $T_6$ of the arrays 1A and 1B are connected to FET switching elements $S_1$–$S_6$ and $S_{10}$–$S_{60}$, respectively. These switching elements $S_1$–$S_6$ are turned on for a short time at the same period T by a pulse from a timing pulse generator 60, as shown in FIG. 16, but the times whereat the switches $S_1$–$S_6$ are turned on are delayed in phase by T/6 each. Also, the switching elements $S_{10}$–$S_{60}$ for the array 1B are turned on at the same period T, and with a phase delay of T/6 each, by a pulse from the pulse generator 60. The relation between the times whereat the pairs of switching elements $S_1$–$S_6$ and $S_{10}$–$S_{60}$ are turned on is determined such that the turn-on of the switching element $S_{10}$ takes place with a time delay of T/4 ($\pi/2$ in phase) with respect to the turn-on of the switching element $S_1$. Accordingly, in response to the successive turn-on of the switching elements $S_1$–$S_6$ and $S_{10}$–$S_{60}$, the photoelectric current of the photodiodes appears successively at the common terminal Tc of the arrays 1A and 1B. This photoelectric current has a peak value associated with the intensity of light and the OFF time of the switching elements, as already noted. A pulse shaping circuit 62 is connected to the common terminal Tc of these arrays 1A and 1B and comprises an operational amplifier 62a, a feedback capacitor 62b, and an FET 62c parallel-connected to the feedback capacitor and turned on and off by the circuit 60. Circuit 62 shapes the photoelectric current from the terminal Tc into a pulse signal having a predetermined pulse width and an amplitude associated with the peak value thereof. Accordingly, at the output of the shaping circuit 62, a pulse output corresponding to the turn-on of the switching elements $S_1$, $S_{60}$, $S_2$, $S_{10}$, $S_3$, $S_{20}$, $S_4$, $S_{30}$ . . . is produced with the timing shown in FIG. 16, with the exception of the pulse amplitude. FET's $S_1'$–$S_6'$, $S_{10}'$–$S_{60}'$ series-connected to the output of the shaping circuit 62 are turned on and off by the pulse generator 60 in synchronism with the FET's $S_1$–$S_6$, $S_{10}$–$S_{60}$ (Sn corresponds to Sn'). Thus, the photoelectric current generated upon turn-on of the FET $S_1$ appears at the output of the shaping circuit 62 as a pulse waveform-shaped as shown in FIG. 16 ($S_1$), and at this time only $S_1'$ is turned on so this pulse output is peak-held for a time T/2 by a peak hold circuit 64 and converted into a rectangular wave having a length T/2, as indicated in FIG. 17A. Subsequently, when the FET $S_{60}$ is turned on, the photoelectric current thereof is likewise converted into a rectangular wave by the peak hold circuit 69, since the FET $S_{60}'$ is then turned on. Thereafter, upon turn-on of the FET's $S_2$, $S_{10}$, $S_3$, $S_{20}$, . . . , the photoelectric currents corresponding thereto are converted into rectangular waves by peak hold circuits 65, 67, 66, 68 . . . selected by the FET's $S_2'$, $S_{10}'$, $S_3'$, $S_{20}'$ associated therewith. The pairs of switching elements $S_1$ and $S_4$, $S_2$ and $S_5$, and $S_3$ and $S_6$ have their ON periods deviated by T/2 with each other, and therefore, simplification of the construction is contemplated by connecting the switching elements $S_1'$, $S_2'$ and $S_3'$ in parallel with the switching elements $S_4'$, $S_5'$ and $S_6'$, respectively and using common peak hold circuits 64, 65 and 66. This also holds true of the switching elements $S_{10}'$–$S_{60}'$. By such construction, a rectangular wave 1S attributable to the turn-on of the switching element $S_1$ and a rectangular wave 4S attributable to the turn-on of the switching element $S_4$, as shown in FIG. 17A, appear alternately in the peak hold circuit 64, and rectangular waves 2S, 5S, 6S and 3S attributable to the switching elements $S_2$ and $S_5$ and switching elements $S_6$ and $S_3$, respectively, as shown in FIGS. 17B and 17C, appear alternately in the peak hold circuits 65 and 66, respectively. An adder circuit 70A adds together the outputs of these circuits 64–66 and produces an output as shown in FIG. 18. A band-pass filter 72A of center frequency $2\pi/T$ extracts the frequency component of $2\pi/T$ from the addition output of the adder circuit 70A and puts out a sine wave as shown in FIG. 19. This sine wave corresponds to equation (3), $$I_0 = \sum_{n=1}^{N} g_n \cdot e^{i(\omega t + 2\pi \times \frac{n}{N})},$$

described in connection with FIG. 11. Also, the photoelectric output from the array 1B is likewise converted into a sine wave by an adder circuit 70B and a band-pass filter 72B of center frequency $2\pi/T$. This sine wave is $$I_0 = \sum_{n=1}^{N} g_n \cdot e^{i(\omega t + \frac{\pi}{4} + 2\pi \times \frac{n}{N})}$$

during the in-focus condition, namely, when an optical image identical to the optical image on the array 1A is formed on the array 1B. In this equation, $\pi/4$ is attributable to the fact that the turn-on of the FET $S_{10}$ in the array 1B is delayed in phase by $\pi/4$ with respect to the turn-on of the FET $S_1$ in the array 1A. The outputs of the two filters 72A and 72B are made into rectangular waves by waveform-shaping circuits 44A and 44B similar to FIG. 10, whereafter they are multiplied and smoothed by a multiplier 46 and an integrating-smoothing circuit 47, whereupon the output of the integrating-smoothing circuit 47 becomes zero during the in-focus condition and outputs of different signs are obtained during the forward focusing and the backward focusing conditions.

In the examples of FIGS. 12 and 15, the outputs of the photosensitive elements are directly controlled by switching elements 101-104, $S_1$-$S_6$ and $S_{10}$-$S_{60}$, but of course the outputs of the photosensitive elements may be first amplified and then controlled by the switching elements.

According to the present invention, by the use of two photosensitive element arrays, forward focusing, in-focus, and backward focusing conditions and the degree thereof can be highly accurately detected from the phase difference between two outputs attributable to the photoelectric outputs of the two arrays.

While preferred embodiments of the invention have been shown and described, it will be apparent to those skilled in the art that changes can be made in these embodiments without departing from the principles and spirit of the invention, the scope of which is defined in the appended claims.

We claim:

1. In a focus detecting apparatus for an optical system including:

first and second image forming optical means for receiving light from an object along first and second spatially separated light paths and forming the image of said object;

first and second photosensitive element arrays disposed in predetermined image planes of said first and second image forming optical means, each of said arrays comprising a plurality of photosensitive elements, and said arrays producing electrical signals representative of the intensity distribution pattern of the light incident thereon, at least one of which varies with the focus of the optical system; and circuit means for detecting the focus of said optical system in accordance with the electrical signals from said first and second arrays;

the improvement residing in that said circuit means includes a first processing circuit for producing an electrical output having a phase representative of the positional relation between said first array and the intensity distribution pattern of the light incident on said first array, in accordance with the electrical signal from said first array, a second processing circuit for producing an electrical output having a phase representative of the positional relation between said second array and the intensity distribution pattern of the light incident on said second array, in accordance with the electrical signal from said second array, and a phase comparing circuit for comparing the phases of the electrical outputs from said first and second processing circuits and producing an output signal representative of the focus position of said optical system.

2. A focus detecting apparatus according to claim 1, wherein each of said first and second processing circuits includes vectorizing means for multiplying the signals of the photosensitive elements of the associated array by vectors whose phase progresses in the order of arrangement of the photosensitive elements of the associated array, and adder means for adding together the vectorized outputs of the photosensitive elements, and wherein said phase comparing circuit determines the phase difference between the combined vector output of said adder means of said first processing circuit and the combined vector output of said adder means of said second processing circuit.

3. A focus detecting apparatus according to claim 2, wherein said comparing circuit produces an output signal representative of a forward focusing condition when the phase of the output of one of said two processing circuits is advanced with respect to the phase of the output of the other processing circuit, an output signal representative of a backward focusing condition when the phase of the output of said other processing circuit is advanced with respect to the phase of the output of said one processing circuit, and an output signal representative of an in-focus condition when said two outputs are in phase with each other.

4. A focus detecting apparatus according to claim 2, wherein the vectorizing means of each of said first and second processing circuits multiplies the signals of associated photosensitive elements by vectors whose phase progressively advances by $2\pi/N$ in the order of arrangement of the associated elements, where N is a natural number equal to or smaller than the number of the associated photosensitive elements.

5. A focus detecting apparatus according to claim 4, wherein each array comprises a plurality of sets of photosensitive elements and has adder circuits for adding together the signals of corresponding photosensitive elements of the sets, and wherein the vectorizing means of each processing circuit multiplies the outputs of the adder circuits by vectors.

6. A focus detecting apparatus according to claim 4, wherein the vectorizing means of said first and second processing circuits have means for converting the signals associated with the light incident on the photosensitive elements of the associated arrays into rectangular wave signals of the same period but having a progressive phase advance of $2\pi/N$ in the order of arrangement of the elements and having amplitudes proportional to the magnitudes of the photosensitive element electrical signals.

7. A focus detecting apparatus according to claim 6, wherein the adder means of said first and second processing circuits add together the outputs of the associated rectangular wave signal converter means, and each of said first and second processing circuits has a filter circuit for filtering the output of the associated adder means, said filter circuit passing a signal of the same frequency as said rectangular wave signals.

8. A focus detecting apparatus according to claim 1 or 2, further comprising:
means for gradually reducing the influence of the signals of a plurality of photosensitive elements located near the opposite ends of each of said first and second arrays upon the outputs of said first and second processing circuits, toward each end of each array.

9. A focus detecting apparatus according to claim 8, wherein said influence reducing means effects the reduction of the influence by gradually reducing the light-receiving areas of the plurality of photosensitive elements near the opposite ends of each array, toward the opposite ends of the array.

10. A focus detecting apparatus according to claim 8, wherein said influence reducing means comprises an optical filter provided in front of the light-receiving surface of each array, the light transmittivity of said filter gradually decreasing toward the opposite ends of said array near the opposite ends thereof.

11. A focus detecting apparatus according to claim 1, wherein said first and second image forming optical means employ light beams from opposite sides of the optical axis of the optical system and produce images that move across the first and second arrays parallel to the order of arrangement of the arrays, respectively, as the focus condition of the optical system varies.

12. A focus detecting apparatus according to claim 1, wherein the first and second image forming optical means employ light beams from the object, respectively, one of which forms an image that moves across the corresponding array parallel to the order of arrangement of that array as the focus condition of the optical system varies.

13. A focus detecting apparatus according to claim 1, wherein each of said first and second processing circuits includes means for producing an electrical output that is separated into orthogonal vector components.

14. A focus detecting apparatus according to claim 13, wherein said circuit means includes means for standardizing said components to reduce the effect of the average illumination of the images.

15. A focus detecting apparatus according to claim 13, wherein said means for producing said orthogonal vector components comprises switching means for passing electrical signals from said photosensitive elements at predetermined times.

16. A focus detecting apparatus according to claim 15, wherein each of said first and second processing circuits further comprises means for combining predetermined passed signals to produce a pair of combined outputs, and a pair of means for sampling and holding the combined outputs, respectively.

17. A focus detecting apparatus according to claim 16, wherein each of said first and second processing circuits further comprises means for combining the outputs from the associated pair of sampling and holding means, and wherein said phase comparing circuit comprises means for comparing signals derived from the last-mentioned combining means.

18. A focus detecting apparatus according to claim 1, wherein said apparatus comprises means for producing a time sequence of signals from said photosensitive elements of said first and second arrays and wherein said first and second signal processing circuits comprise means responsive to signals from said time sequence for producing said electrical outputs.

19. A focus detecting apparatus according to claim 18, wherein said time sequence producing means comprises means for producing a pulse train, and wherein said means responsive to signals from said time sequence comprises means for producing a rectangular wave signal dependent upon pulses of said pulse train.

* * * * *